United States Patent
Mau et al.

(10) Patent No.: US 8,584,066 B1
(45) Date of Patent: Nov. 12, 2013

(54) SYSTEM AND METHOD FOR GENERATING A WIRE MODEL

(75) Inventors: Hendrik Thomas Mau, Dresden (DE); Guntram Jummel, Dresden (DE)

(73) Assignee: GLOBALFOUNDRIES, Inc., Grand Cayman (KY)

( * ) Notice: Subject to any disclaimer, the term of this patent is extended or adjusted under 35 U.S.C. 154(b) by 0 days.

(21) Appl. No.: 13/603,052

(22) Filed: Sep. 4, 2012

(51) Int. Cl.
*G06F 17/50* (2006.01)

(52) U.S. Cl.
USPC .......................................... 716/110

(58) Field of Classification Search
USPC ................................. 716/100, 110
See application file for complete search history.

(56) References Cited

U.S. PATENT DOCUMENTS

| 6,743,503 | B1 | 6/2004 | Chen | |
|---|---|---|---|---|
| 6,856,148 | B2* | 2/2005 | Bodenstab | 324/713 |
| 2006/0036421 | A1* | 2/2006 | Sekino et al. | 703/13 |
| 2006/0236303 | A1* | 10/2006 | Wilson et al. | 717/104 |
| 2007/0099314 | A1* | 5/2007 | Chen et al. | 438/14 |
| 2009/0077507 | A1* | 3/2009 | Hou et al. | 716/4 |

* cited by examiner

*Primary Examiner* — Suchin Parihar
(74) *Attorney, Agent, or Firm* — Ingrassia Fisher & Lorenz, P.C.

(57) ABSTRACT

An exemplary embodiment of a system and a method for generating a wire model is provided. The system comprises a processor coupled to a display device, a user input device, and a storage device. The processor is configured to (1) generate a wire configuration file, (2) determine parasitic component values from the wire configuration file, and (3) construct a table model from the parasitic component values.

9 Claims, 2 Drawing Sheets

SYSTEM AND METHOD FOR GENERATING A WIRE MODEL

TECHNICAL FIELD

Embodiments of the subject matter described herein relate generally to integrated circuit design. More particularly, embodiments of the subject matter described herein relate to a system and method for generating a wire model for signal integrity analysis and functional design verification.

BACKGROUND

A simplified process for fabricating an integrated circuit comprises the steps of developing a product idea, designing a circuit, fabricating the circuit, packing and assembling the product. The circuit design process can be further refined to include the steps of refining the product idea, creating a logic schematic, and verifying the functionality of a circuit layout. As manufacturing processes have decreased below 50 nanometers, circuit layouts more frequently fail to meet design requirements during functional verification of the circuit layout. These failures may be due to the close proximity of the circuit elements, which increases parasitic components (e.g., parasitic capacitance, parasitic resistance and parasitic inductance). The parasitic components delay the propagation of electrical signals through the circuit and may cause signal integrity problems, preventing the circuit from meeting the design requirements. If the circuit design fails to meet the design requirements, the designer must modify the circuit design and retest the new design until all design requirements are met. This repetitive process adds additional cost to the process and delays the completion of the design.

A wire model may be utilized to determine the parasitic effects of the circuit design, in order to help avoid expensive redesign later in the design process. Silicon foundries or cell library vendors may develop the wire model from statistical information taken from various sample designs. However, in specific designs, a wire model may not be available, and the designer may be required to know the distributed resistance and capacitances of the wires. In addition, the wire models are complex, cumbersome, and time consuming to develop and use.

Considering the foregoing, it would be desirable to provide a system and method for generating a wire model without complex functions that would allow a designer to vary the accuracy of the model depending on given requirements. Furthermore, other desirable features and characteristics will become apparent from the following detailed description and the appended claims taken in conjunction with the accompanying drawings and this Background.

BRIEF SUMMARY

In an exemplary embodiment, a method for generating a wire model is provided. The method comprises generating a wire configuration file. The parasitic component values are determined from the wire configuration file and used to construct a table model incorporating the parasitic component values to calculate the signal integrity of a circuit.

Also provided is an exemplary method for generating a wire model by providing a wire geometry and selecting a technology having a plurality of technology parameters. A range for each one of the plurality of technology parameters are defined. A wire configuration file is then created from the wire configuration and the plurality of technology parameters. Parasitic component values are determined from the wire configuration file and incorporated into a Verilog-A table model to calculate the signal integrity of a circuit.

Furthermore, an exemplary embodiment of a system for generating a wire model is provided. The system comprises a processor coupled to a display device, a user input device, and a storage device. The processor is configured to (1) generate a wire configuration file, (2) determine parasitic component values from the wire configuration file, and (3) construct a table model from the parasitic component values.

BRIEF DESCRIPTION OF THE DRAWINGS

A more complete understanding of the subject matter may be derived by referring to the detailed description and claims when considered in conjunction with the following figures, wherein like reference numerals refer to similar elements throughout the figures, and wherein:

DETAILED DESCRIPTION

The following detailed description of the invention is merely illustrative in nature and is not intended to limit the embodiments of the subject matter or the application and uses of such embodiments. As used herein, the word "exemplary" means "serving as an example, instance or illustration." Any implementation described herein as exemplary is not necessarily to be construed as preferred or advantageous over other implementations. Furthermore, there is no intention to be bound by any expressed or implied theory presented in the preceding Technical Field, Background, Brief Summary or the following Detailed Description.

As stated previously, it would be desirable to provide a system and method for generating a wire model to determine the signal integrity issues (e.g., signal delay, cross talk, and signal IR drop) caused by parasitic components (e.g., parasitic capacitance, parasitic resistance and parasitic inductance) in an integrated circuit. This may be accomplished in accordance with an embodiment by generating a wire configuration, determining the parasitic component values from the wire configuration, and constructing a table model that uses the parasitic component values. This will allow designers to generate a wire model that is tailored to their requirements without the generation process to be to complex, cumbersome, and time consuming.

Figure 1:
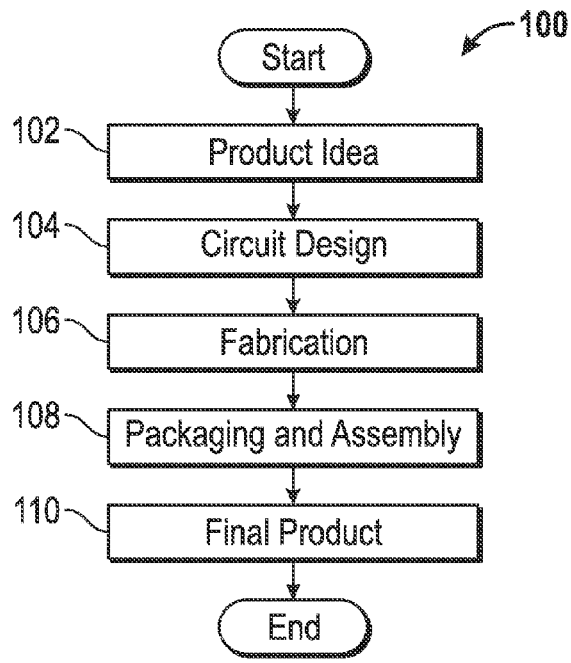
FIGS. 1 and 2 are flow charts illustrating the various steps in the design and fabrication of an integrated circuit in accordance with an embodiment.

FIG. 1 is a flow chart 100 that illustrates simplified and exemplary steps in the design and fabrication of an integrated circuit in accordance with an embodiment. A product idea is developed, (STEP 102) including a set of desired capabilities. A circuit is then designed (STEP 104) to meet the set of desired capabilities (STEP 102), this process is further described in FIG. 2. The circuit design is then fabricated (STEP 106), packaged (STEP 108), and assembled (STEP 110). It is to be understood that this description is not meant to limit the present embodiment and is for illustrative purposes only. The described steps may be performed in a different sequence or not at all depending on the individual requirements of the design.

Figure 2:
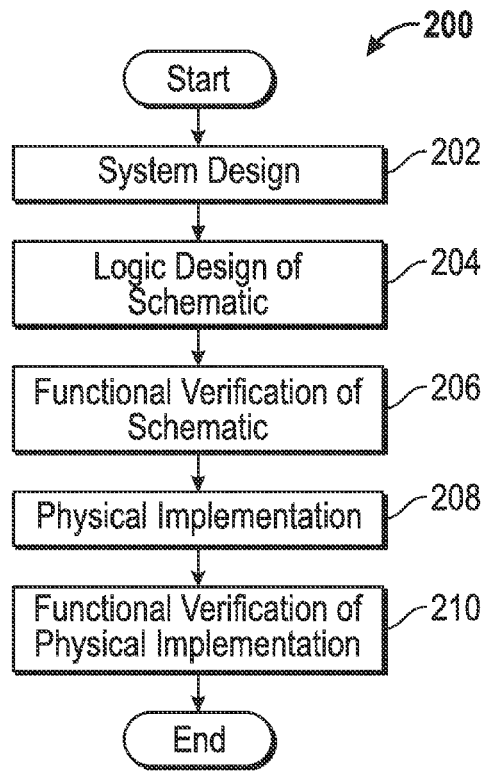

FIG. 2 is a flow chart 200 that further describes the circuit design process (STEP 102, FIG. 1). The product idea (STEP 102, FIG. 1) is refined into a set of design requirements (STEP 202). The design requirements may include the functionality of the designed block, limits on delay times, silicon area, power consumption/dissipation, and etc. Trade-offs may have to be made between certain design requirements. For example, the dimensions of the transistors may have to be increased in order to reduce the time delays. During this step, the designer may have a considerable amount of freedom to design the circuit, due to the fact there are multiple different ways of implementing a circuit design.

A logic schematic is created from the system design requirements (STEP 204). A schematic editor may be employed to transform a high level description of the circuit into a transistor-level or gate-level schematic. The logic schematic must accurately describe the electrical properties of all components and their interconnects. This is because the logic schematic will be used to create a corresponding netlist that will be tested to determine if the circuit design meets the design requirements (STEP 202).

A simulator is used to verify that the logic schematic (STEP 206) meets the design requirements (STEP 202). Each circuit element (e.g., resistors, capacitors, and inductors) has individual resistances, capacitances and inductances that are associated with each circuit element. However, based on the vertical and lateral spacing of circuit elements parasitic components (e.g., parasitic capacitance, parasitic resistance) may be created and add to the overall resistance and capacitance of the circuit. Parasitic components are undesirable effects resulting from the close proximity of circuit elements in an integrated circuit. Such undesirable effects include reducing the speed that electrical signals propagate through the circuit, possibility resulting in the failure of the circuit to meet the design requirements. To help ensure that the parasitic components can be accounted for at this design stage, an embodiment of a wire model is employed to estimate the impact of the parasitic components as is described in connection with FIG. 3 below.

A physical implementation of circuit elements (e.g. resistors, capacitors, and inductors) (STEP 208) is created to represent the logic schematic. The circuit will be fabricated from this physical implementation. A design rule checking tool (e.g. Calibre or SNPS Hercules) is then used to verify that the physical implementation conforms to a set of design rules. The design rules help to ensure that the fabrication of the circuit is possible and that there is a low probability of fabrication defects. The physical implementation is then verified (STEP 210) to ensure that it meets all circuit design requirements (STEP 112, FIG. 1). A simulator is utilized to detect the electrical performance and functionality of an extracted netlist from the physical implementation. The simulator can accurately predict the signal integrity of the physical implementation to determine if the design requirements are met.

Figure 3:
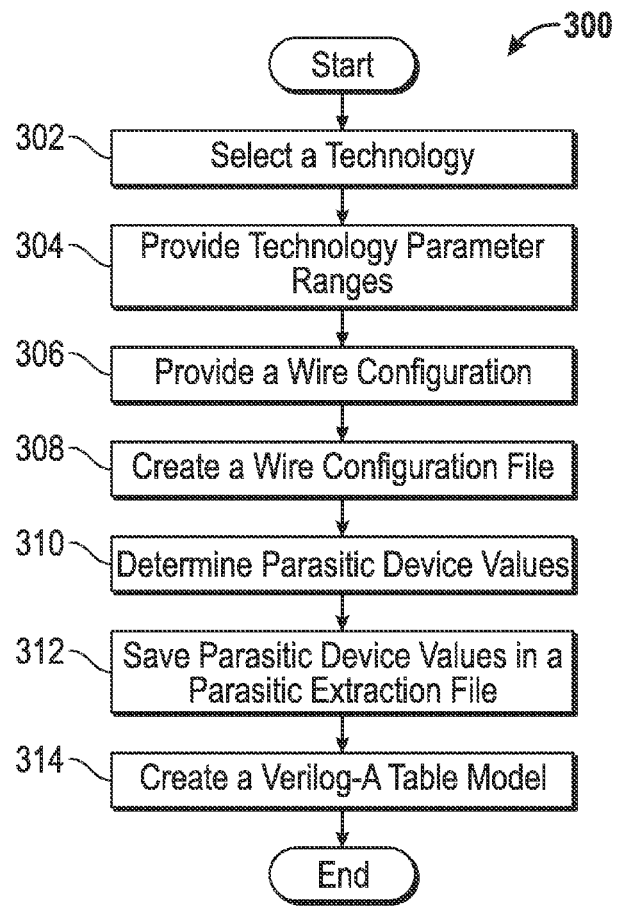
FIG. 3 is an exemplary embodiment of a process for generating a wire model.

FIG. 3 is a flow chart 300 illustrating an exemplary process for generating a wire model. A technology (e.g., twenty nanometers (nm), twenty-eight nm, thirty-two nm, and etc.) is selected (STEP 302) to be used in the fabricating the circuit. Each fabrication process has specific requirements that define the fabrication process. For example, the twenty-two nm manufacturing process requires that half the distance between identical features be substantially twenty-two nm. Other requirements of the fabrication process may include wire width and wire length.

The technology parameters and their ranges can be individually selected (STEP 304), to allow the embodiment of the wire model to be tailored to the specific requirements of the design. The ranges of the technology parameters are based on the design requirements and the selected technology (STEP 302). The technology parameters may include properties of the target wire, properties of neighbor wires, properties of adjacent layers, and other suitable technology parameters. The parasitic component values will be determined from an individual wire (e.g. target wire). The target wire technology parameters may include a target layer parameter (e.g., the composition), a wire width parameter (e.g., the physical width), and a wire length parameter (e.g., the physical length). The adjacent layers technology parameters may include an above layer parameter and below layer parameter (e.g., the composition of the layers above and below the target wire, respectively). In addition, the model may include a density above parameter and density below parameter (e.g., the ratio of wire width to the spacing above and below the target wire, respectively). The neighbor wires technology parameters may include a spacing left parameter and spacing right parameter (e.g., the physical distance from the neighbor wire to the target wire). Furthermore, the model may include a width of left parameter and width of right parameter (e.g., the physical width of the left and right neighbor wires, respectively).

A wire configuration is provided (STEP 306) for determining parasitic component values. For example, the provided wire configuration may be comprised of five wires, two wires to the left and two wires to the right of the target wire. The wire configuration may be further defined with a perpendicular wire above and below the target wire. This specific configuration may be chosen due to the fact lithography limitations define the fabrication process which impacts both the wire width and spacing parameters. Each of these parameters contribute to the parasitic component values of the given wire configuration.

A processor 406 (FIG. 4) is configured to populate a wire configuration file (STEP 308) using a parameterized cell generator (PCell). The PCell will generate the file from the wire configuration (STEP 306) and the selected technology parameters (STEP 304). The detailed netlist is then saved in a Design Exchange Format (DEF), Graphic Database System II (GDSII), Open Artwork System Interchange Standard (OASIS), OpenAccess, or any other suitable file formats. All of these formats may be accepted by a field solving program to calculate the parasitic component values. The DEF file is an open specification for representing a netlist and circuit layout of an integrated circuit in an ASCII format. The GDSII and OASIS are file formats that are used to represent geometric shapes. GDSII is a binary file format for representing planar geometric shapes, text labels, and other information about the layout in hierarchical form. While OASIS represents shapes such as polygons, rectangles and trapezoids and defines properties each shape can have, how they can be organized, and location in relation to each other. The OpenAccess format has been developed, deployed and has supported an open-sourced design database with shared controls.

The parasitic component values are determined (STEP 310) from the wire configuration file by utilizing a field solving program (e.g., Rapid3D). The field solving program extracts the parasitic component values by solving a form of Maxwell's equations. Maxwells' equations are typically solved by one of three different methods. The first method uses a differential form of the governing equations and requires discretization of the entire domain in which the electromagnetic fields reside. While, most circuit design extraction problems are exterior problems, this method requires a solution to an extremely large number of elements in the discretization. The second method uses integral equations and requires a discretization for only the sources of the electromagnetic field. This method may require less complicated calculations but may lack the accuracy required for complex circuit designs. The third method is a random-walk method that uses both the differential and integral forms of the equations to reach a solution. The third method provides the required accuracy for complex circuit designs, while limiting the total number of elements that are required to be solved.

After the parasitic components have been determined from the wire configuration file, the parasitic component values are saved in a parasitic extraction file (STEP 312) in a Standard Parasitic Exchange Format (SPEF) or Detailed Standard Parasitic Format (DSPF) format. The SPEF and DSPF are Institute of Electrical and Electronics Engineers (IEEE) standard format for representing parasitic data of wires in an integrated circuit in an ASCII format. This file format is a standard format that the field solving program can export the determined parasitic component values.

The parasitic component values are extracted from the data strings contained in the parasitic extraction file. The data strings are split based on punctuation contained in each data string and are saved in a Verilog-A table. A Verilog-A model (STEP 314) incorporates the Verilog-A table and will be used in a simulation program with integrated circuit emphasis (SPICE) to calculate the signal integrity caused by the parasitic component values. If for a given wire configuration, data is missing from the Verilog-A table, the Verilog-A model will perform an interpolation function to estimate the missing values. However, if the missing data is outside of the discretized area, the embodied wire model has been created to throw an error. This ensures that there are no undetected inaccuracies when using the embodied wire model.

Figure 4:
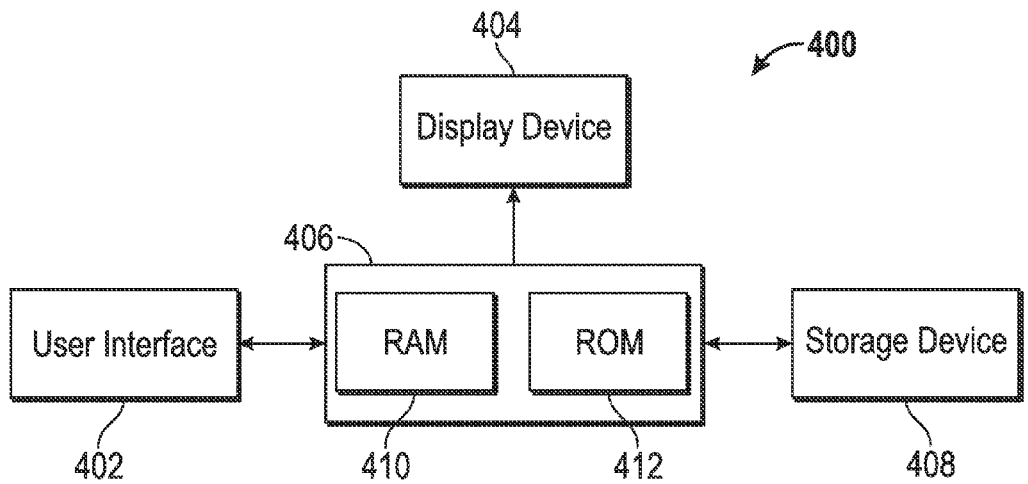
FIG. 4 is an exemplary embodiment of a system for generating a wire model.

FIG. 4 illustrates a system 300 that can generate a wire model including a user interface 302, one or more display devices 304, a processor 306, and a data source 308. The user interface 302 is in operable communication with the processor 306 and is configured to receive input from a user and, in response to the user input, supplies command signals to the processor 306. For example, the user will enter various commands through the user interface 302 to control the processor to generate a wire configuration file. The user interface 302 may be any one, or combination, of various known user interface devices including, but not limited to, one or more keyboards, curser controllers, buttons, switches, or knobs.

The processor 306 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 306 includes on-board RAM (random access memory) 310, and on-board ROM (read-only memory) 312. The program instructions that control the processor 306 may be stored in either or both the RAM 310 and the ROM 312. For example, the operating system software may be stored in the ROM 312, whereas various operating software may be stored in the RAM 310. It will be appreciated that this is merely exemplary of one scheme for storing operating system software and software programs, and that various other storage schemes may be implemented.

The memory 310 and 312, may be realized as RAM memory, flash memory, EPROM memory, EEPROM memory, registers, or any other suitable storage medium. In this regard, the memory 310, 312 can be coupled to the processor 306 such that the processor 306 can read information from, and write information to, the memory 310, 312. In the alternative, the memory may be integrated into the processor 306. As an example, the processor 306 and the memory 310, 312 may reside in an ASIC. No matter how the processor is specifically implemented, it is in operable communication with the software databases 308, and the display devices 304. The processor 306 is configured, to generate a wire configuration file, determine parasitic component values from the wire configuration file, and construct a table model from the parasitic component values in response to commands from the user through the user interface devices 302. The display devices 304, in response to the user commands, will selectively render various types of textual, graphic, and/or iconic information to inform the user of the inputted commands.

The display devices 304, as noted above, in response the user commands, selectively render various textual, graphic, and/or iconic information, and thereby supplies visual feedback to the user. It will be appreciated that the display device 304 may be implemented using any one of numerous known display devices suitable for rendering textual, graphic, and/or iconic information in a format viewable by the user. Non-limiting examples of such display devices include various cathode ray tube (CRT) displays, and various flat screen displays such as various types of LCD (liquid crystal display) and TFT (thin film transistor) displays. The display devices 304 may additionally be implemented as a screen mounted display, or any one of numerous known technologies.

Thus, there has been provided a system and method for generating a wire model. The wire model allows for estimation of the signal integrity of an integrated circuit early in the circuit design process without using complex functions. In addition, the accuracy of the model varied depending on given requirements. This allows for efficient formation of the design to help ensure that the design schedule deadlines are met. Furthermore, the wire model can provide the designer with information prior to the logic design step, of restrictions are imposed in a given technology. This information will help the designer to make informed decisions about circuit design requirements and to predict the design trade-offs.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A system for generating a wire model, comprising:
 a display device;
 a user input device;
 a storage device; and
 a processor coupled to the display device, the user input device, and the storage device and configured to perform the following electronically-implemented process steps:
  generating a wire configuration file, wherein the step of generating the wire configuration file, comprises:
   providing a wire geometry, wherein the wire geometry comprises a target wire, two wires to the left of the target wire, two wires to the right of the target wire, and a perpendicular wire both above and below the target wire;

selecting a technology having a plurality of technology parameters, wherein the technology parameters comprise each of a target layer, wire width, and wire length, above layer, below layer, density above, and density below, space left, space right, width of left neighbor, and width of right neighbor;

defining a range for the plurality of technology parameters; and creating the wire configuration file from the wire geometry and the plurality of technology parameters;

determining parasitic component values from the wire configuration file, wherein the parasitic component values comprise each of a resistance, capacitance, and inductance, wherein determining the parasitic component values, comprises:

determining the parasitic component values from the wire configuration file by solving Maxwell's equations; and creating a parasitic extraction file that incorporates the parasitic component values in the form of data strings; and constructing a table model incorporating the parasitic component values, wherein constructing a table model comprises:

extracting the parasitic component values from the parasitic extraction file;

creating a look-up table that incorporates the parasitic component values; and constructing the table model from the look-up table, wherein the table comprises a Verilog-A table and the table model is a Verilog-A table model, and wherein the table model is configured to perform and interpolation function to estimate missing table values.

2. The method according to claim 1 wherein creating the wire configuration file comprises saving the wire configuration file in a Design Exchange Format file type.

3. The method according to claim 1 wherein creating the wire configuration file comprises saving the wire configuration file in a Graphic Database System II file type.

4. The method according to claim 1 wherein creating the wire configuration file comprises saving the wire configuration file in an Open Artwork System Interchange Standard file type.

5. The method according to claim 1 wherein creating the parasitic extraction file comprises saving the parasitic extraction file in a Standard Parasitic Exchange format file format.

6. The method according to claim 1 wherein creating the parasitic extraction file comprises saving the parasitic extraction file in a Detailed Standard Parasitic Format file format.

7. The system of claim 1, wherein solving Maxwell's equations is performed by utilizing: a differential form of governing equations.

8. The system of claim 1, wherein solving Maxwell's equations is performed by utilizing: an integral form of governing equations.

9. The system of claim 1, wherein solving Maxwell's equations is performed by utilizing: a random-walk method.

* * * * *